H. KOPPER.
REGULATING AND REVERSING APPARATUS.
APPLICATION FILED FEB. 3, 1910.

956,106.

Patented Apr. 26, 1910.

2 SHEETS—SHEET 1.

Witnesses:
Walter Langenberg
Otto Baepler

Inventor:
Heinrich Kopper
by B. Singer
Attorney.

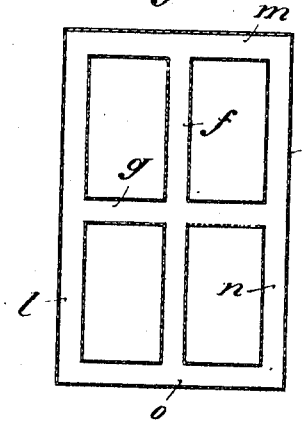
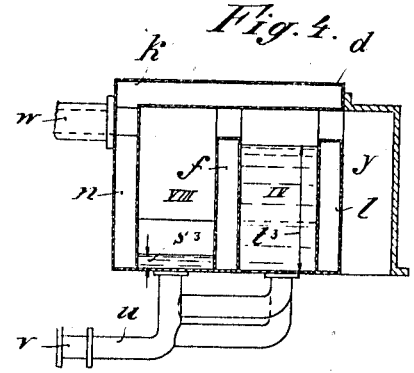
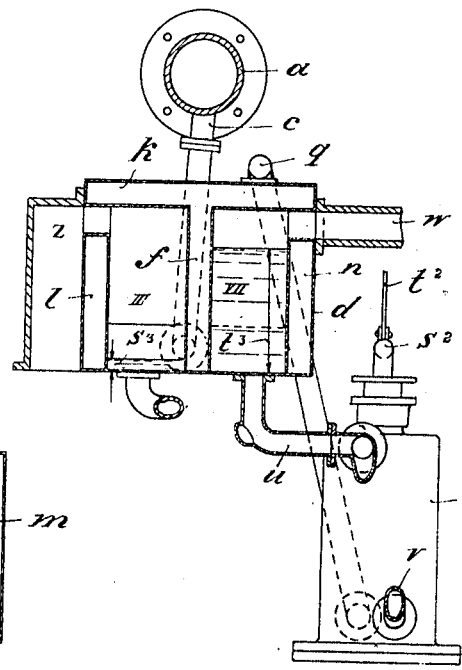
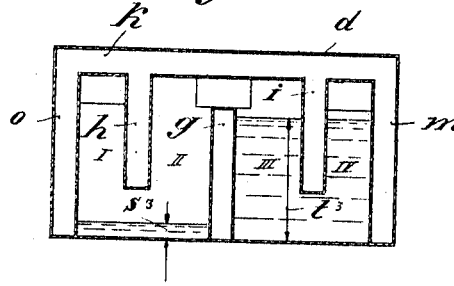

UNITED STATES PATENT OFFICE.

HEINRICH KOPPER, OF BRUCHHAUSEN, GERMANY.

REGULATING AND REVERSING APPARATUS.

956,106. Specification of Letters Patent. Patented Apr. 26, 1910.

Application filed February 3, 1910. Serial No. 541,905.

*To all whom it may concern:*

Be it known that I, HEINRICH KOPPER, a subject of the German Emperor, residing at Bruchhausen, in the Empire of Germany and State of Rhenish Prussia, have invented new and useful Improvements Relating to Regulating and Reversing Apparatus.

My invention relates to regulating and reversing apparatus for regenerating gas furnaces which cause the gas to be burned and the burned gas to flow through a vessel having division walls some of which reach from top to bottom while some reach either not quite to the bottom or not quite to the top. The chambers thereby formed in the interior of said vessel contain water the level of which varies and so provides a passage for the one or the other gas as will be required, said level being controlled from cylinders fitted with pistons having hollow rods through which the water is discharged.

Figure 1:
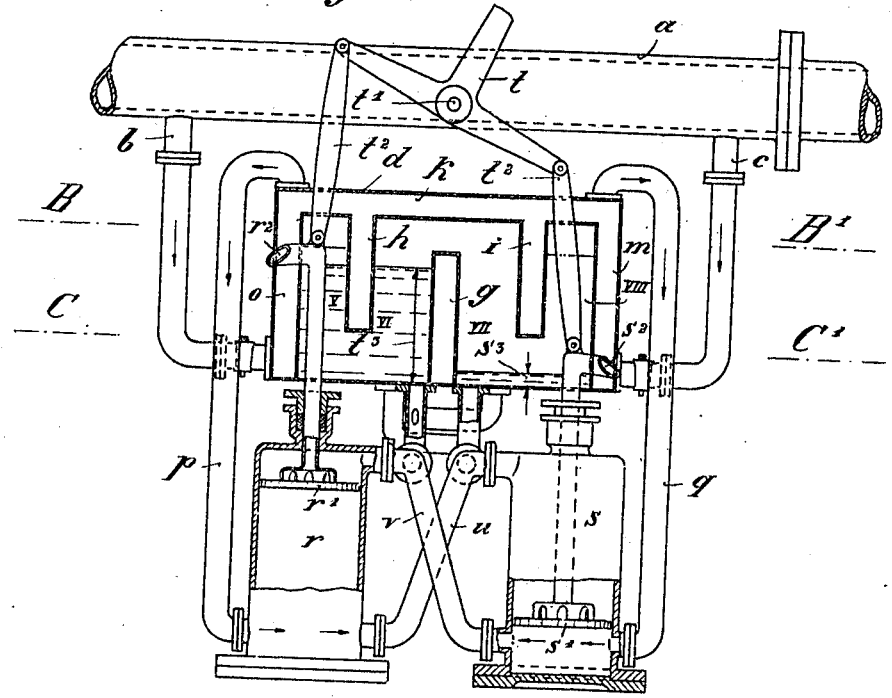
Figure 2:
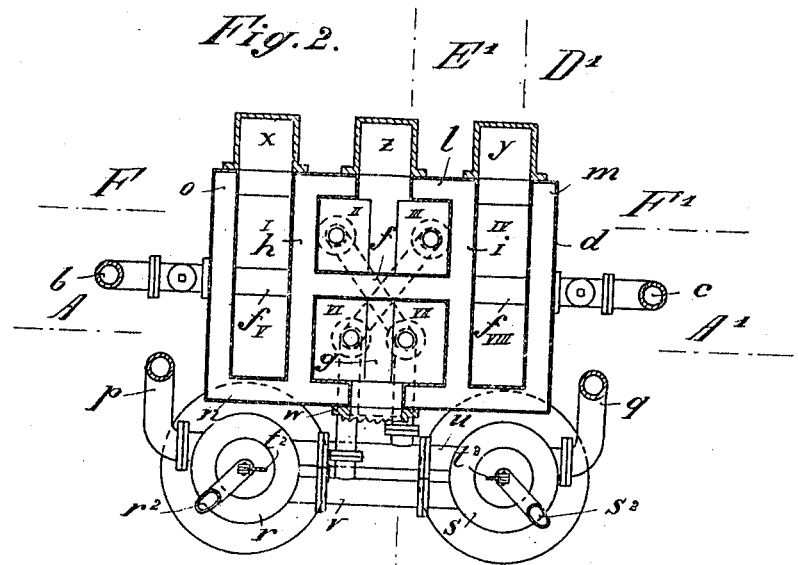

The apparatus is shown in the accompanying drawings, in which:

Figure 1 is a front-elevation partly shown as a section on line $A-A^1$ of Fig. 2. Figs. 2, 3, 4, 5 and 6 are sections taken respectively on the lines $B-B^1$, $C-C^1$ of Fig. 1, $D-D^1$, $E-E^1$ and $F-F^1$ of Fig. 2.

From a pipe $a$ which, for example, conducts away the refrigerating water of a Siemens-Martin furnace, two pipes $b$ and $c$ lead to the vessel $d$. The latter is divided into a plurality of chambers by means of double walls $f$ to $o$ and contains water of varying levels. The internal walls do not all reach to the bottom such as the walls $h$ and $i$, or the top $k$ of the vessel as shown by the wall $g$. The wall $f$ touches along its full width the bottom of the vessel, its middle portion—between the walls $h$ and $i$—extends to the top or cover $k$, while the side portions—between the walls $o$, $h$ and $i$, $m$—do not extend so far up. All the walls are hollow and form continuous passages for the refrigerating fluid which the pipes $b$ and $c$ deliver into the external hollow walls $o$ and $m$. The refrigerating water or fluid is discharged through the pipes $p$ and $q$ which lead into cylinders $r$ and $s$. These cylinders are fitted with pistons $r^1$, $s^1$ respectively which have hollow piston rods through which the water from the opposite cylinder and from the inner chambers of the vessel $d$ escapes. The pipe $u$ connects the upper space of cylinder $s$ with the lower space of cylinder $r$ and branches off into the chambers II and VII, The pipe $v$ connects the lower space of cylinder $s$ with the upper space of cylinder $r$ and branches off into the chambers III and VI.

Movement is imparted to the pistons by a rocking lever $t$ fulcrumed at $t^1$ and carrying at its ends links $t^2$ which are secured to the piston rods of the cylinders $r$ and $s$ respectively so that the position of the rocking lever directly controls the position of the outlet openings $r^2$ and $s^2$ of the piston rods. The gas enters through the conduit $w$ into the vessel by the chambers VI and VII, while such gas can be discharged through a chimney flue $z$ which connects the chambers II and III with the outer air. On each side of the flue $z$ is a furnace flue $x$ or $y$ which communicates with the chambers I and IV respectively.

The reversing action is as follows: With the rocking lever disposed as is shown in Fig. 1, the refrigerating water or fluid passes through the pipe $b$ into the hollow walls $o$ and then through the walls $f$, $l$, $n$ and $k$ and through the walls following in communication therewith so that it eventually passes through the pipe $p$ into the space below the piston $r^1$ of the cylinder $r$. The water then ascends the pipe $u$ and also enters the chambers VII and II from which latter it passes through a bottom space left by the walls $h$ and $i$ and flows into the chambers I and VIII which become filled to a certain level. The water from the pipe $u$ also enters the upper space of the cylinder $s$ and finally passes through the hollow piston rod to the outlet $s^2$ where it is running away through suitable discharge channels. Similarly the second refrigerating current flows through the pipe $c$, through all the hollow walls of the vessel $d$, the down-tube $q$, the lower space of cylinder $s$, the connecting pipe $v$ and then enters the chambers III, IV, V, VI, which are not traversed by the first mentioned current, where it ascends to a certain level and at the same time discharges at $r^2$ through the hollow piston rod of the cylinder $r$.

The level of the water in the chambers I II VII and VIII as well as that in the chambers III, IV, V, VI, will naturally vary according to the position of the rocking lever $t$ and that of the outlets $s^2$ and $r^2$ with reference to the bottom of the vessel $d$. In the drawings the water level in the first named chambers is marked $s^3$ and in the last named chambers it is marked $t^3$. The gas passes through the pipe w into the vessel d and circulates through the chambers thereof in different directions by reason of the position of the rocking lever and consequent water-level in said chambers. With the position shown in Fig. 1, the gas from the inlet pipe w enters the chambers VI and VII and as the water-level in the chamber VI is above the lowest edge of the wall h, the gas cannot flow away. The chamber VII has its water-level below the wall i and allows the gas to pass into the chamber VIII and then through the upper opening in the wall f into chamber IV and thence along the furnace-flue y into the regenerating furnace. After circulating through the latter it flows along the furnace-flue x into the chamber I where it passes below the wall h into chamber II and then direct into the chimney-flue z. For altering the direction of the gas-current in the generating furnace, the rocking lever t is turned over to the other side so that the outlet $r^2$ descends while $s^2$ ascends. By reason of the principle of level in communicating vessels, the levels in the various chambers will be reversed from low level to high level and vice versa. The gas from the pipe w can no longer escape from the chamber VII after the previously described manner, and now passes from the chamber VI beneath the wall h into the chamber V, then over the wall f into the chamber I and into the furnace-flue x. The gas therefore circulates in an opposite direction through the furnace which it leaves through the furnace-flue y, then enters chamber IV, passes beneath the wall i into the chamber III and escapes direct into the chimney-flue z. By placing the rocking lever t in a median position the flow of gas is interrupted and the communication between the furnace and the chimney is closed. Therefore while reversing the direction of the gas-current, no gas may escape without having passed the furnace. In some instance I may dispense with the hollow walls for single walls and then connect the pipes b and c direct with the cylinders r and s.

Having now particularly described and ascertained the nature of my said invention, and in what manner the same is to be performed, I declare that what I claim is:

1. In a regulating and reversing apparatus for regeneration furnaces, the combination with a vessel, divided into a plurality of chambers, upper and lower openings in the partition walls between said chambers, of conduits supplying gas to said chambers and conducting it away from them, of two cylinders having their upper and lower parts connected by pipes, each of said pipes connecting two of the chambers, of hollow piston rods in said cylinders, having discharge openings for the residue of water, and of means for simultaneously elevating one piston rod and lowering the other, substantially as described and for the purpose set forth.

2. In a regulating and reversing apparatus for regeneration furnaces, the combination with a vessel, divided into a plurality of chambers, upper and lower openings in the partition walls between said chambers, of conduits supplying gas to said chambers and conducting it away from them, of two cylinders having their upper and lower parts connected by pipes, each of said pipes connecting two of the chambers, of hollow piston rods in said cylinders, having discharge openings for the residue of water, and being connected by a locking lever having links secured to said rods and controlling said discharge openings of the piston rods, substantially as described and for the purpose set forth.

3. In a regulating and reversing apparatus for regeneration furnaces, the combination with a vessel, containing water of varying levels, divided into a plurality of chambers, upper and lower openings in the partition walls between said chambers, of conduits supplying gas to said chambers and conducting it through a chimney into the atmosphere, of two cylinders having their upper and lower parts connected by pipes, each of said pipes connecting two of the chambers, of hollow piston rods in said cylinders, having discharge openings for the residue of water, and of means for simultaneously elevating one piston rod and lowering the other, substantially as described and for the purpose set forth.

HEINRICH KOPPER. [L. S.]

Witnesses:
OTTO KÖNIG,
CHAS. J. WRIGHT.